US012531914B2

(12) United States Patent
Brecl

(10) Patent No.: US 12,531,914 B2
(45) Date of Patent: Jan. 20, 2026

(54) MANAGING EDGE NETWORK PROTECTION SERVICE

(71) Applicant: Level 3 Communications, LLC, Broomfield, CO (US)

(72) Inventor: Peter Brecl, Highlands Ranch, CO (US)

(73) Assignee: Level 3 Communications, LLC, Denver, CO (US)

( * ) Notice: Subject to any disclaimer, the term of this patent is extended or adjusted under 35 U.S.C. 154(b) by 189 days.

(21) Appl. No.: 18/539,640

(22) Filed: Dec. 14, 2023

(65) Prior Publication Data

US 2024/0259433 A1 Aug. 1, 2024

Related U.S. Application Data

(60) Provisional application No. 63/441,331, filed on Jan. 26, 2023.

(51) Int. Cl.
*H04L 9/40* (2022.01)

(52) U.S. Cl.
CPC .......... *H04L 63/20* (2013.01); *H04L 63/0263* (2013.01); *H04L 63/0815* (2013.01)

(58) Field of Classification Search
CPC .. H04L 63/20; H04L 63/0263; H04L 63/0815
See application file for complete search history.

(56) References Cited

U.S. PATENT DOCUMENTS

| 11,153,155 | B1 | 10/2021 | Perez |
| 12,095,853 | B1* | 9/2024 | Cowan ................. H04L 67/101 |
| 2007/0107043 | A1 | 5/2007 | Newstadt |
| 2009/0262741 | A1* | 10/2009 | Jungck ................ H04L 41/5054 |
| | | | 370/392 |
| 2013/0283263 | A1 | 10/2013 | Elemary |
| 2019/0058656 | A1* | 2/2019 | Gundersen ............ H04L 47/122 |
| 2024/0056415 | A1* | 2/2024 | Tang ................... H04L 61/4511 |

OTHER PUBLICATIONS

International Search Report and Written Opinion of the International Searching Authority, dated Mar. 28, 2024, Int'l Appl. No. PCT/US2023/083988, Int'l Filing Date Dec. 14, 2023; 13 pgs.

* cited by examiner

*Primary Examiner* — Oleg Korsak

(57) ABSTRACT

Novel tools and techniques are provided for implementing management of edge network protection service. In various embodiments, a computing system may receive a request from a customer to manage edge network protection services for at least one Internet circuit. Based on a determination that the customer has been provisioned one or more circuits that are capable of implementing edge network protection services, the computing system may present, or cause to be presented, options to select a circuit, from among the one or more circuits, for which edge network protection service should be provisioned or managed. When a selection of a first circuit is received from the customer, the computing system may automatically cause the selected first circuit to be configured to provision a new service instance of the edge network protection service or reconfigured to modify an existing service instance of the edge network protection service.

19 Claims, 7 Drawing Sheets

MANAGING EDGE NETWORK PROTECTION SERVICE

CROSS-REFERENCES TO RELATED APPLICATIONS

This application claims the benefit of U.S. Provisional Application No. 63/441,331 filed Jan. 26, 2023, entitled "Managing Edge Network Protection Service," which is incorporated herein by reference in its entirety.

This application may be related to U.S. patent application Ser. No. 18/327,953 (the "'953 Application"), filed Jun. 2, 2023, entitled, "Efficient Provisioning of Internet Circuit and Secure Domain Name System," the disclosure of which is incorporated herein by reference in its entirety for all purposes.

The respective disclosures of these applications/patents (which this document refers to collectively as the "Related Application(s)") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network provisioning and management functionalities, and, more particularly, to methods, systems, and apparatuses for implementing management of edge network protection service.

BACKGROUND

Many small businesses are dependent on computing and access to the Internet to compete in the modern marketplace. In addition, protection from unauthorized or ill-advised access from a business's network to prohibited web sites is desirable. However, many small business owners lack technical expertise to configure equipment or securely control employees' online activities. Some small business owners also desire to add edge network protection services after already having subscribed to Internet service, whether from the same network service provider or a different one. However, the process for provisioning such services can be complicated, especially for such standalone services. Managing of such services is also conventional not available to the business owners.

It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 $105a$-$105n$, the integer value of n in $105n$ may be the same or different from the integer value of n in $110n$ for component #2 $110a$-$110n$, and so on.

DETAILED DESCRIPTION OF CERTAIN EMBODIMENTS

Overview

Figure 1:
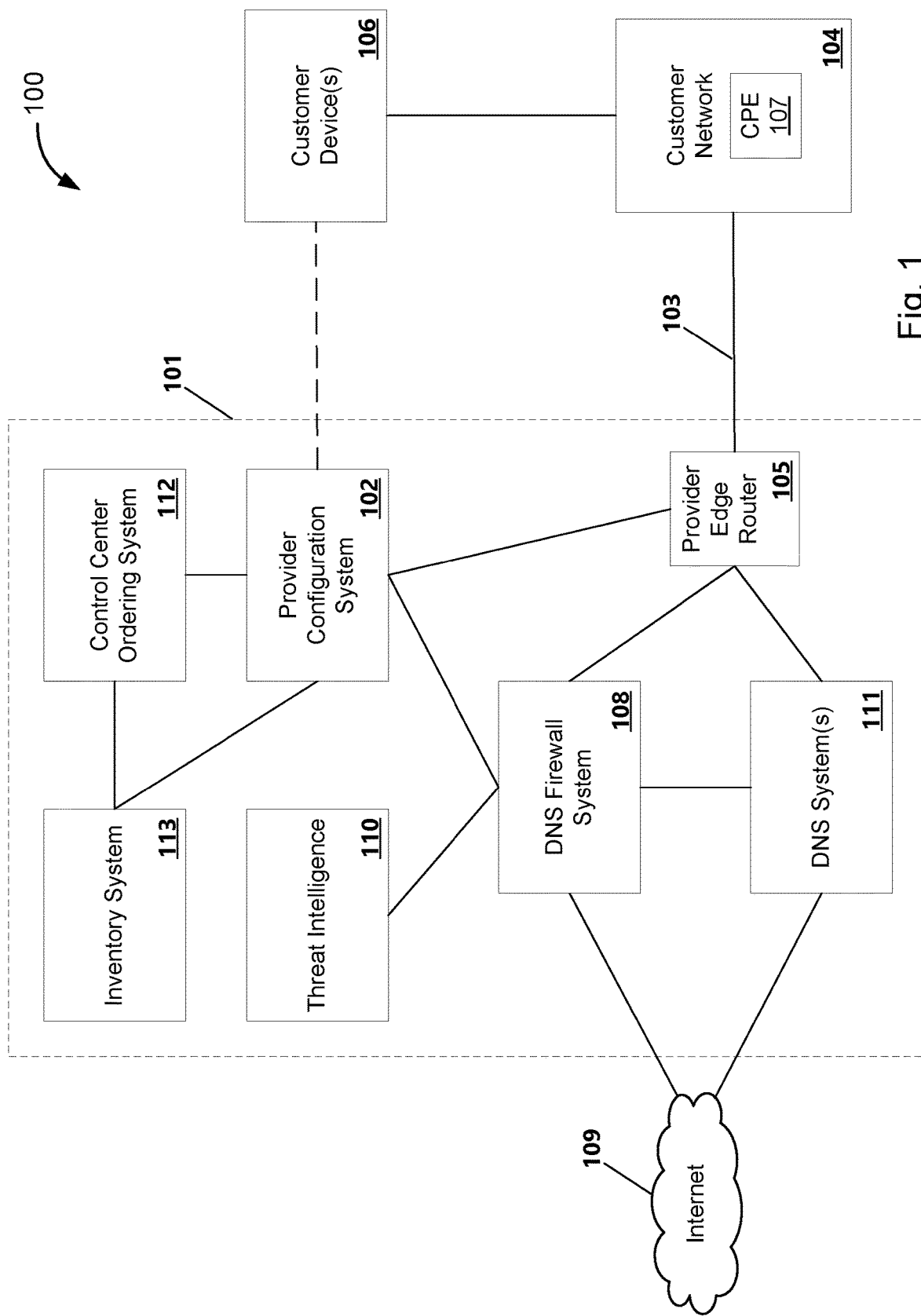
FIG. 1 is a schematic diagram illustrating a system for implementing management of edge network protection service, in accordance with various embodiments.

Various embodiments provide tools and techniques for implementing network provisioning and management functionalities, and, more particularly, to methods, systems, and apparatuses for implementing management of edge network protection service.

In various embodiments, a computing system may receive a request from a customer to manage edge network protection services for at least one Internet circuit, the request including customer information. The computing system may determine whether the customer has already been provisioned any circuits that are capable of implementing edge network protection services, based at least in part on the customer information. Based on a determination that the customer has been provisioned one or more circuits that are capable of implementing edge network protection services, the computing system may cause to be presented options to select a circuit, from among the one or more circuits, for which edge network protection service should be provisioned or managed. When a selection of a first circuit, from among the one or more circuits, is received from the customer, one of the following may be performed: based on a determination that a service instance of the edge network protection service has not been provisioned on the selected first circuit, the computing system may automatically cause the selected first circuit to be configured to provision a first service instance of the edge network protection service; or based on a determination that the first service instance of the edge network protection service has already been provisioned on the selected first circuit, automatically causing, by the computing system, the selected first circuit to be reconfigured to modify the first service instance of the edge network protection service.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive, a request from a customer to manage edge network protection services for at least one Internet circuit, wherein the request includes customer information; determine whether the customer has already been provisioned any circuits that are capable of implementing edge network protection services, based at least in part on the customer information; based on a determination that the customer has been provisioned one or more circuits that are capable of implementing edge network protection services, cause to be presented options to select a circuit, from among the one or more circuits, for which edge network protection service should be provisioned or managed; and when a selection of a first circuit, from among the one or more circuits, is received from the customer, perform one of: based on a determination that a service instance of the edge network protection service has not been provisioned on the selected first circuit, automatically causing the selected first circuit to be configured to provision a first service instance of the edge network protection service; or based on a determination that the first service instance of the edge network protection service has already been provisioned on the selected first circuit, automatically causing the selected first circuit to be reconfigured to modify the first service instance of the edge network protection service.

In yet another aspect, a computing system may receive a request from a customer to manage edge network protection services for at least one Internet circuit, the request including customer information. The computing system may determine whether the customer has already been provisioned any circuits that are capable of implementing edge network protection services, based at least in part on the customer information. Based on a determination that the customer has been provisioned one or more circuits that are capable of implementing edge network protection services, the computing system may cause to be presented options to select a circuit, from among the one or more circuits, for which edge network protection service should be provisioned or managed. When a selection of a first circuit, from among the one or more circuits, is received from the customer, the computing system may automatically cause the selected first circuit to be configured to provision a first service instance of the edge network protection service.

The various embodiments provide for edge network protection services that the user or customer can order or manage via the customer portal, e.g., to add, remove, or change service parameters, even for standalone services (e.g., edge network protection services ordered after Internet service has already been provisioned, or edge network protection services from a network service provider different from the network service provider that has already provisioned Internet services to the user, or the like).

These and other aspects of the management of edge network protection service are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing network provisioning and management functionalities, and, more particularly, to methods, systems, and apparatuses for implementing management of edge network protection service, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Further, in the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

With reference to the figures, FIG. 1 is a schematic diagram illustrating a system 100 for implementing management of edge network protection service, in accordance with various embodiments.

As shown in the non-limiting example of FIG. 1, a provider configuration system 102 may be provided by an Internet service provider or other network provider to allow customers to arrange for network connectivity (e.g., an Internet circuit 103 between customer network 104 and a provider edge router 105 on network 101 to permit customer device(s) 106 operating on or connected to customer network 104 access to a wide area network, such as the Internet 109). It will be understood that all connections between systems depicted with respect to FIG. 1 can be wired or wireless and may include various intervening devices and systems.

The provider configuration system 102 may provide a customer portal, including a user interface, to allow Internet connectivity to be ordered by, and then provisioned for, a customer. For example, the provider configuration system 102 may be operatively connected to one or more customer devices 106 (e.g., through a third-party wired or wireless connection prior to the customer Internet circuit 103 being provisioned). In examples, after the customer Internet circuit 103 is provisioned, the same or different customer device(s) 106 may connect to the Internet 109 through customer network 104, customer Internet circuit 103, and provider edge router 105. In examples, the customer network 104 comprises at least one device referred to as customer premises equipment ("CPE") 107. In examples, CPE 107 may comprise a network address translation ("NAT") device (or router with NAT capabilities) that assigns Internet protocol ("IP") addresses to customer devices 106 on the customer network 104 and routes messages into and out of customer network 104.

In examples, the provider network 101 may also provide a domain name system ("DNS") firewall system 108. DNS firewall system 108 may, in examples, provide a DNS firewall service to filter DNS requests from customer networks, such as customer network 104. The DNS firewall system 108 may permit or deny access to particular Internet sites (or other network locations) by customer device(s) 106. For example, DNS firewall system 108 may maintain customizable configurations for multiple customers (each customer being a tenant of the DNS firewall system 108). The configuration may include customer-specific instructions related to categories of Internet sites, such as social media, news, sports, entertainment, etc. For example, a first customer may allow customer devices connected to its network to access social media sites, while another customer may choose to ban such access from its customer network.

When a customer device attempts to access the Internet 109 via Internet circuit 103, a browser on the customer device may issue a DNS request to translate a domain name (e.g., www.example.com) to a particular IP address so that the desired site can be reached. When the DNS firewall system 108 receives a DNS request from a customer network 104 to resolve a particular domain name to an IP address, the DNS firewall system may first determine a category for the particular domain name, determine whether that category of domain is permitted by that customer network to be accessed, and either cause the request to be resolved (e.g., by returning an IP address for the domain) or reject the request (if the domain is in a prohibited category for that customer network). DNS firewall system 108 may also be operatively connected to a threat intelligence system 110 and/or one or more separate DNS systems 111, as discussed further herein.

Figure 2:
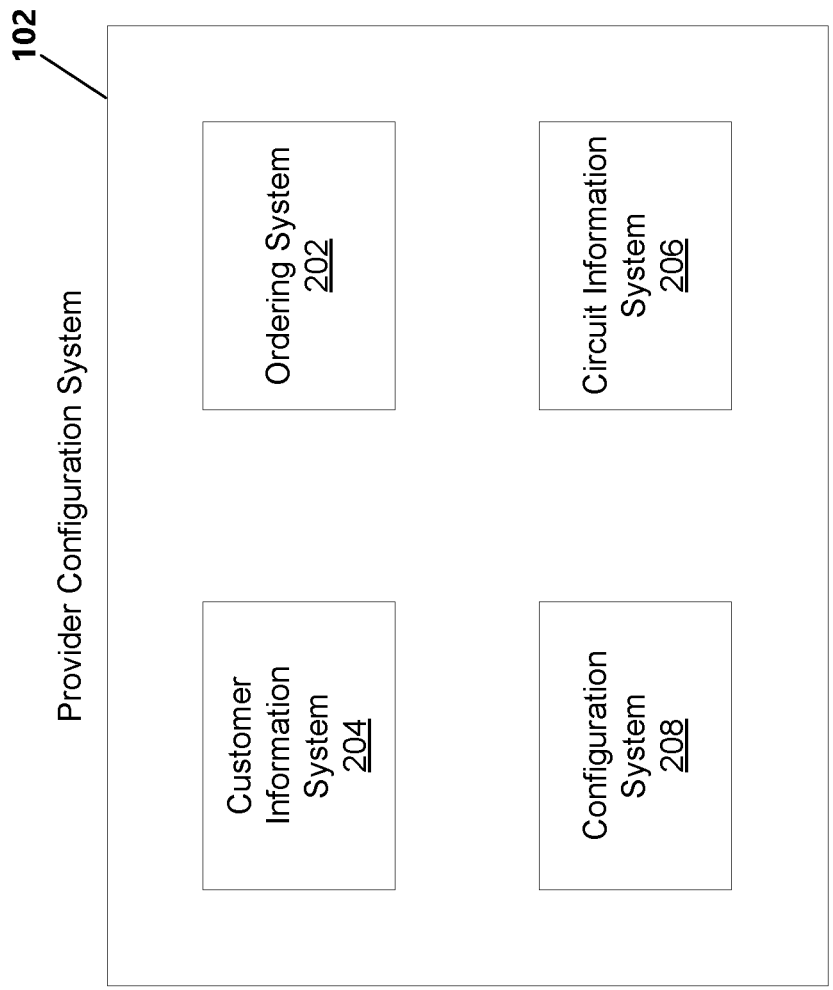
FIG. 2 is a schematic diagram illustrating a non-limiting example of the provider configuration system of FIG. 1, in accordance with various embodiments.

A nonexclusive example of the provider configuration system 102 is depicted at FIG. 2. In the example provider configuration system 102, an ordering system 202, customer information system 204, circuit information system 206, and configuration system 208 may be provided. As discussed, any of the systems of provider configuration system 102 may be combined or distributed across one or many physical devices operatively connected by wired or wireless connections in an implementation combining software and hardware.

In examples, ordering system 202 may comprise a customer portal to permit customers of network 101 to order certain products and services. For example, the ordering system 202 may provide one or more user interfaces for display on a device (such as customer device 106). In examples, a customer may provide (through such user interface(s)) customer information, such as customer name, physical location of the customer, whether the customer is providing its own customer premises equipment 107 or needs it to be delivered to the customer as part of an ordered service, etc. Among other things, the ordering system 202 may collect the information needed from a customer to provision a new Internet circuit 103 between a provider edge router 105 of the network 101 and the customer network 104 (including CPE 107).

Customer information system 204 may comprise one or more data stores to store customer information, e.g., the customer information received through the ordering system 202. In some examples, customer information stored in customer information system 204 may be received or retrieved from other computing systems of the provider. For example, if the customer is ordering an Internet circuit 103 from the provider using ordering system 202, the customer may already be a customer of other products/services of the provider, and information about the customer may already be stored in, or accessible to, customer information system 204. For example, the customer may already have an Internet circuit, but may be ordering an additional Internet circuit 103. In this instance, the ordering system may (e.g., based on a previously stored account identifier) retrieve the customer information from the customer information system 204 as part of the ordering process for the new Internet circuit 103.

Circuit information system 206 may, in examples, store, or be configured to retrieve from one or more other network systems, information about the network 101, including existing Internet circuits, available ports on provider edge router(s) 105, available IP address space(s) for assignment to a new Internet circuit 103, etc. Circuit information system 206 may be used by ordering system 202 to provide information about the nearest available provider edge router(s) 105 for a particular customer (e.g., based on the customer information received through ordering system 202). Circuit information system 206 may also cooperate with configuration system 208, as described below.

Configuration system 208 may, in examples, cause the services ordered through ordering system 202 to be provisioned within network 101. For example, when ordering system 202 receives a request from a customer for a new Internet circuit 103, the configuration system 208 may cooperate with the circuit information system 206 to determine the most advantageous way to provision the new Internet circuit 103. For example, configuration system 208 may, in examples, identify one or more available ports on an existing provider edge router 105 for the new Internet circuit 103. In other examples, the configuration system 208 may determine that a new provider edge router 105 should be added to network 101 (either in a new location or at an existing location) in order to accommodate the new Internet circuit 103. Configuration system 208 may also cause one or more workflows to be initiated to cause technicians to design or implement the new Internet circuit 103. Configuration system 208 may also assign the IP address space to the new Internet circuit 103 (e.g., assigning a first IP address of the assigned IP address space to the CPE 107 and a second IP address of the assigned IP address space to the provider edge router 105). In examples, configuration system 208 may automatically cause the provider edge router 105 to be configured to advertise the IP addresses of the assigned IP address space.

In examples, configuration system 208 may also cause CPE 107 to be automatically configured. In some examples, the provider of network 101 will also provide the CPE 107 to the customer, and the identification of the CPE (e.g., device type, MAC address, etc.) may be assigned by the configuration system 208 and stored in the customer information system 204. For example, if the provider of network 101 is also providing the CPE 107 to the customer as part of the order for the new Internet circuit 103, the CPE 107 may be pre-configured to "call home" to configuration system 208 in order to receive configuration information. The configuration information provided to CPE 107 may, for example, include one or more IP addresses for the CPE 107. The configuration information may also include one or more IP addresses for one or more provider edge routers 105 that the CPE 107 will use in routing outgoing traffic from customer network 104 to network 101. In some examples, the configuration information is stored by customer information system 204 and/or circuit information system 206.

As discussed, using ordering system 202, the customer may order a new Internet circuit 103. The ordering system 202 may be available to automated processes through an application programming interface ("API"). In some examples, the ordering system 202 may also provide the customer with a simple option to order a DNS firewall service for the new Internet circuit 103. For example, in the same user interface used to order the Internet circuit 103 (e.g., a checkbox or other selectable option on the same web page presented to the customer, or a series of related web pages presented to the user before an order is submitted or equivalent actions performed through an API-based ordering system), the customer may be permitted to optionally add the DNS firewall service. In examples, the DNS firewall service (e.g., provided by DNS firewall system 108) allows the customer to restrict the domains that customer device(s) 106 are permitted to access from customer network 104.

In examples, combining the process for ordering and provisioning the new Internet circuit 103 and the DNS firewall system 108 for that circuit permits efficiencies and functionality not possible using separate ordering/provisioning processes. As a nonexclusive example, the configuration system 208 may automatically configure the CPE 107 to cause DNS requests to be directed from customer devices 106 to the DNS firewall system 108. For example, the CPE 107 may be programmed to provide a DNS firewall system IP address configuration (e.g., using Dynamic Host Configuration Protocol ("DHCP") configuration settings) to the individual customer devices 106, which then will use the DNS firewall system 108 for DNS resolutions. Among other things, the CPE 107 may be automatically and remotely configured by configuration system 208 (e.g., when the CPE 107 "calls home" to receive configuration information) to configure the DNS settings in that DHCP configuration, which is then used by customer device(s) 106 to obtain an IP address advertised by the DNS firewall system 108. In some examples, remote configuration of the CPE 107 may be accomplished by sending a configuration from the configuration system 208 to the CPE 107, using an executable configuration script. The executable configuration script can be specific to the type of device that comprises CPE 107 (e.g., manufacturer, model, etc.), and it can be operable to configure the CPE 107 to apply the correct DNS firewall system IP address configuration to the customer devices 106. In some examples, the CPE 107 may also be configured by configuration system 208 to solely allow DNS requests from customer device(s) 106 if such requests are directed to the DNS firewall system 108 for DNS resolution, thereby reducing the risk for some of the techniques used by customer device 106 users or malicious actors to circumvent the use of the DNS firewall system 108 for DNS resolution.

Configuration system 208 may also communicate with DNS firewall system 108 to automatically configure the customer as a new tenant of the DNS firewall service and alert the DNS firewall system 108 that DNS requests from the IP address space assigned to the new Internet circuit 103 should be filtered using the DNS firewall service. In some examples, the configuration system 208 does not directly configure the CPE 107 to direct all DNS requests from customer device(s) 106 to the DNS firewall system 108, but instead causes an automatic process to be initiated at the DNS firewall system 108 to communicate with the CPE 107 and cause such configuration to occur. In other examples, the CPE 107 may not be managed by the provider of network 101. As such, configuration system 208 may instead cause a notification to be sent to the customer with instructions for how to configure the CPE 107 in order to direct all DNS requests from customer device(s) 106 to the DNS firewall system 108.

Figure 3:
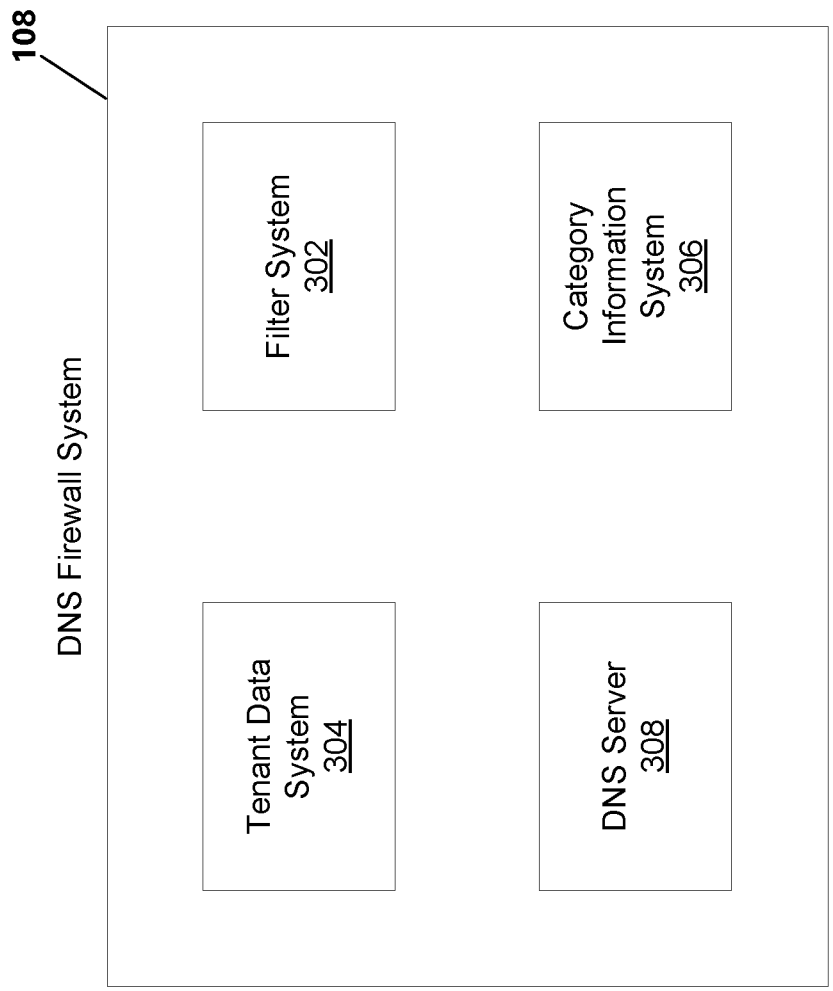
FIG. 3 is a schematic diagram illustrating a non-limiting example of the DNS firewall system of FIG. 1, in accordance with various embodiments.

An example DNS firewall system 108 (used to provide the DNS firewall service) is described with respect to FIG. 3. In some examples, the DNS firewall system is collocated with provider edge router 105, e.g., at an edge computing site of network 101. In examples, DNS firewall system may comprise a filter system 302, tenant data system 304, category information system 306, and DNS server 308. Filter system 302 may, for example, be configured to reject DNS requests that are directed to domains that are not permitted to be accessed by customer device(s) 106 on customer network 104. In examples, rejecting a DNS request may comprise dropping the request (not resolving the domain in the request to an IP address) and returning a notification to the customer device(s) 106 (through CPE 107) indicating that the domain sought to be reached by the customer device(s) 106 is not permitted pursuant to rules of the customer network 104. In other examples, rejecting the DNS request may comprise resolving the domain to an IP address not for the requested site, but for a site that displays such notification.

Tenant data system 304 may store, or be configured to retrieve from one or more other network systems, tenant information about tenants of the DNS firewall system 108. In examples, the tenant information may comprise portions of the customer information received from provider configuration system 102 when a new Internet circuit 103 is ordered with DNS firewall service. For example, tenant information stored (or retrievable) by tenant data system 304 may include customer name and location, customer contact information, a type of equipment that comprises the CPE 107, and the IP address space assigned to the Internet circuit(s) 103 for that customer and for which the DNS firewall service has been subscribed. Tenant data may also include tenant configuration information for the particular customer regarding the domains (or categories of domains) for which DNS requests should be rejected (or allowed) by filter system 302.

In some examples, the tenant data system 304 receives a request from provider configuration system 102 when a new Internet circuit 103 is ordered along with the DNS firewall service for that circuit. In examples, the tenant data system 304 automatically extracts customer information from the received request and (if the customer is not already a tenant of the DNS firewall system 108), automatically provisions the customer as a new tenant. In examples, the request from provider configuration system 102 also includes the IP address space associated with the new Internet circuit. The tenant data system 304, in examples, stores the IP address space in association with the newly created tenant (based on the customer information) or with previously stored tenant information (if the customer is already a tenant).

In addition, the request from the provider configuration system 102 also causes the tenant data system 304 to initiate a configuration process for the DNS firewall service. For example, the tenant data system 304 may use the customer contact information included in the request from provider configuration system to send a message (e.g., an email) to initiate a process by which the customer chooses categories of domains for which DNS requests will be rejected by filter system 302. In examples, the tenant data system 304 will provide a user interface (e.g., selectable via a link in an email to the customer) to turn filtering on or off for particular categories of domains. In other examples, such link may direct the customer to a portal in a control center associated with the DNS firewall system 108. In other examples, the customer may separately navigate to such control center for customization of the DNS firewall service configuration. In other examples, the customer may utilize an API associated with the DNS firewall system 108 for customization of the DNS firewall service configuration. In examples, the tenant data system 304 will provide default selections (e.g., based on majority preferences of other DNS firewall service tenants, or otherwise) and use the default selections in the absence of other instructions from the customer. In some examples, all customers are provided with such default selections as a starting point in the user interface of the tenant data system 304 from which the customer can then customize its particular selections for filtering. The user interface presented by tenant data system 304 may, in examples, also allow customers to specifically designate certain domains on access-allowed lists and access-denied lists, each of which may override decisions that would otherwise be made on category information. Tenant configuration data stored in the tenant data system 304 may specify the domains or categories of domains for which DNS request should be filtered (or permitted). Tenant configuration data may be applied for all Internet circuits of the tenant. In other examples, the tenant configuration data may be specific to particular Internet circuit(s) of a tenant, groups of end-users, and individual end-users of the tenant.

In examples, the filter system 302 and tenant data system 304 may coordinate with a category information system 306, which may store, or be configured to retrieve from one or more other network systems, current information about domain categories. For example, category information system 306 may store lists of known domain names and may associate one or more categories with such domain names. For example, a domain "example1.com" may be categorized in category information system 306 as a social media site, while another domain "example 2.com" may be categorized as a video streaming site. In some instances, a particular domain may be associated with multiple categories.

Category information system 306 may receive (or retrieve) data from third-party service(s) and may be continually updated as new sites are added or discovered. In examples, category information system 306 may communicate with threat intelligence system 110. The threat intelligence system 110 may maintain a list of known malicious sites. Such list may be separately used by the threat intelligence system 110 (e.g., in conjunction with other network elements of a threat mitigation system) to mitigate the effect of such sites (e.g., by dropping any packets received from source IP addresses associated with such sites). The threat intelligence system 110 may provide its list of known malicious sites to the category information system 306. If threat intelligence system 110 identifies particular domains as participating in malicious activity on network 101, the category information system 306 may create a category of known malicious domains and associate the domains with that category that are so identified by the threat intelligence system 110. The tenant data system 304 may, by default, store configuration data selecting the category of known malicious domains for filtering out (or rejection) by filter system 302. In some examples, the known malicious domains category is not de-selectable for filtering by the customer through the user interface presented by tenant data system 304. As discussed, however, in some examples, a customer may specifically add particular domains to an access-allowed list (and override any category determinations). In some examples, the tenant data system 304 and/or category information system 306 may cooperate to alert the threat intelligence system 110 when a particular number or percentage of customers have added a domain that appears in the known malicious domains category to an access-allowed list. In some examples, this permits the threat intelligence system 110 (through automation or an administrator thereof) to review the site to determine whether it should remain on the known malicious domains list at the threat intelligence system 110. In other examples, the DNS firewall system 108 may communicate other filtering information to threat intelligence system 110, such as when a particular number or percentage of tenants have added a domain to an access-denied list, log information indicating a frequency at which DNS request are being rejected (and information about the particular domains or categories for which DNS requests are being rejected), etc.

In some examples, the DNS firewall system 108 may also include a DNS server 308. For example, DNS server 308 may operate as a DNS recursor to communicate with DNS root servers, top-level domain servers, and/or authoritative name servers (and related caches or other devices) in order to resolve any DNS request that is not filtered out by filter system 302. As an example, if a DNS request to resolve "www.example.com" is received by DNS firewall system from CPE 107 through provider edge router 105, the filter system 302 may extract the domain (i.e., "example.com") from the DNS request and query category information system 304 for all of the categories with which "example.com" is associated. Filter system 302 may also query tenant information system to determine (a) whether the IP address space from which the DNS request was received is currently associated with a tenant of the DNS firewall service; and (b) if so, whether the tenant information indicates that domains for any of identified categories are subject to filtering for the identified tenant. If the filter system 302 determines that the DNS request should not be filtered (or rejected), it may pass the request to the DNS server 308 for resolution to an IP address for the requested domain. In other examples, the DNS firewall system 108 does not include a dedicated DNS server, and the filter system 302 may pass any of the DNS request that is not rejected to a separate DNS server 111.

In addition, in some examples, the CPE 107 may be configured to send DNS requests to the DNS firewall system 108, but the customer may eventually discontinue DNS firewall service for the particular Internet circuit 103. In some examples, the tenant data system 304 may communicate with configuration system 208 to automatically reconfigure CPE 107 to address outgoing DNS requests to an IP address not associated with DNS firewall system 108. In other examples, however, the CPE 107 may not be automatically (or otherwise) reconfigured and may continue sending DNS requests to DNS firewall system 108. In some examples, the filter system 302 may (a) receive the request; (b) determine that the Internet circuit 103 is no longer associated with a tenant of the DNS firewall service; and (c) either reject the DNS request or forward the request to a different DNS server, such as DNS server 111. In some examples, the filter system 302 may also notify the customer that DNS requests are being rejected and that CPE 107 needs to be reconfigured to address DNS request elsewhere. In some examples, the filter system 302 may forward such DNS requests to DNS server 111 only for a certain period of time following termination of DNS firewall service for the Internet circuit 103, after which time such DNS requests may be dropped. In some examples, the notification(s) to the customer may include an amount of time remaining before such DNS requests will start to be rejected without the CPE 107 being reconfigured to address DNS requests to a different DNS server (such as DNS server 111).

In some aspects, with reference to FIG. 1, control center ordering system 112 and inventory system 113 may also be provided in network 101. In some embodiments, system 100 may be further provided to allow customers to order or manage edge network protection services. For example, in operation, provider configuration system 102, DNS firewall system 108, and/or DNS system(s) 111 (each and/or collectively, "computing system" or the like) may present, or may cause to be presented, a platform for ordering or managing edge network protection services. The computing system may receive a request from a customer (e.g., via customer device(s) 106, or the like) to manage edge network protection services for at least one Internet circuit (e.g., Internet circuit 103, or the like), the request including customer information (such as the customer information as described above, or the like, including order and service history, or the like). The computing system may determine whether the customer has already been provisioned any circuits that are capable of implementing edge network protection services, based at least in part on the customer information, in some cases, by querying records of provisioned circuits as stored in inventory system 113, or the like. Based on a determination that the customer has been provisioned one or more circuits (among circuits 103, or the like) that are capable of implementing edge network protection services, the computing system may present, or may cause to be presented, options to select a circuit, from among the one or more circuits, for which edge network protection service should be provisioned or managed. When a selection of a first circuit, from among the one or more circuits, is received from the customer, the computing system may perform one of: based on a determination that a service instance of the edge network protection service has not been provisioned on the selected first circuit, automatically causing the selected first circuit to be configured to provision (e.g., via provider configuration system 102, or the like) a first service instance of the edge network protection service; or based on a determination that the first service instance of the edge network protection service has already been provisioned on the selected first circuit, automatically causing the selected first circuit to be reconfigured to modify the first service instance of the edge network protection service.

According to some embodiments, presenting, or causing to be presented, the options to select a circuit, from among the one or more circuits, for which edge network protection service should be provisioned or managed may comprise presenting, or causing to be presented, the options in one of a user interface ("UI"), a software application ("app"), or a control portal for the customer to select a circuit, from among the one or more circuits, for which edge network protection service should be provisioned or managed. In examples, the computing system may perform at least one of: providing programmatic access to an ordering system (e.g., control center ordering system 112 and/or ordering system 202 of provider configuration system 102, or the like) via a first API by exposing the first API to permit programmatic ordering of new edge network protection services; providing programmatic access to a provider configuration system via a second API by exposing the second API to permit programmatic management of edge network protection services; causing a first UI to be presented, where the first UI provides user selectable options for the customer to order new edge network protection services; or causing a second UI to be presented, where the second UI provides user selectable options for the customer to manage edge network protection services; and/or the like. Alternatively, or additionally, the computing system may further perform at least one: presenting, or causing to be presented, options for additional security controls for utilizing DNS functionalities (e.g., for DNS firewall system 108 and/or DNS system(s) 111, or the like); presenting, or causing to be presented, options for additional threat intelligence functionalities for a DNS firewall system (e.g., DNS firewall system 108, or the like); or presenting, or causing to be presented, options for specific configurations for the DNS firewall system; and/or the like.

In some embodiments, the selected first circuit may be caused to be configured to provision the service instance of the edge network protection service. In such cases, the computing system may cause a first edge protect tenant to be created in a control portal (similar to tenants being created for the DNS firewall system 108, as described above, with tenant information similarly being stored in, or retrievable by, tenant data system 304, or the like); and may associate the created first edge protect tenant with at least one of the first service instance of the edge network protection service or an IP address space that is assigned to the selected first circuit. In some instances, the control portal (similar to the customer portal of the provider configuration system 102, as described above, or the like) may be accessible by the customer via single sign-on ("SSO") functionality. In some examples, the computing system may apply distributed denial of service ("DDoS") protection to destination IP addresses that are specified on the selected first circuit, based on the provisioned first service instance of the edge network protection service. In some examples, the computing system may add the first service instance of the edge network protection service to the first edge protect tenant.

According to some embodiments, based on a selection by the customer to configure at least one new second circuit from among the one or more circuits, the computing system may determine a first number of circuits that the customer has already configured out of a total number of circuits that the customer has ordered, and may update a number of entitlements (e.g., a number of not-yet provisioned services from among the ordered services, or the like) that the customer is assigned based on the determined first number of circuits. In some cases, based on a determination that a third circuit, from among the one or more circuits, has been selected and has been already configured or ordered, the computing system may cause an ordering system to communicate with a provider configuration system to perform at least one of incrementing the first number of circuits or decrementing the updated number of entitlements. In some examples, when instructions for selecting a fourth circuit, from among the one or more circuits, to delete a service instance of edge network protection service have been received from the customer, the computing system may cause the provider configuration system to perform at least one of decrementing the first number of circuits or incrementing the updated number of entitlements.

In some embodiments, the network may comprise a first network associated with a first network service provider. In such cases, the computing system may present, or may cause to be presented, options to select at least one third party circuit for which edge network protection service should be provisioned or managed, the at least one third party circuit being operated and provisioned by a second network service provider that is different from the first network service provider. The computing system may also present, or may cause to be presented, options for entering circuit information for the at least one third party circuit.

According to some embodiments, when a user requests to add an edge network protection service instance, the computing system may query the inventory (e.g., inventory system 113, or the like) or a copy actual network configuration of eligible Internet Services. The user may select the internet service that the edge network protection service shall be applied to. The computing system may query for assigned IP address information for the selected internet service (or circuit) and may present, or may cause to be presented, the IP address blocks associated with the circuit. The user may select the IP address ranges from the presented list to be associated with the edge network protection service. In some cases, the computing system may ensure that the selected IP address ranges do not exceed the defined service limits (e.g., the number of usable IP addresses in a subnet, such as/27 subnet, or the like). In the case that the computing system does not have access to the IP address space associated with the selected Internet service, the user may be presented with the UI option to manually associate IP addresses with the Internet service. The computing system may ensure that manually entered IP address ranges likewise do not exceed the defined service limits.

In some embodiments, when the user requests to add edge network protection service to a standalone Internet service (either the first network service provider or the second network service provider, or the like). In this case, the inventory system may not be able to successfully find the desired Internet service to associate the requested edge network protection service with. The user may be presented with the UI option to manually associate IP addresses with the standalone Internet service. In some cases, the user may be allowed to add a friendly name for the standalone Internet service. In some instances, the computing system may ensure that manually entered IP address ranges do not exceed the defined service limits (as described above). Once the user selects the existing or standalone Internet service and completes the IP address space selection and/or provides the IP address space (as in the case of the standalone Internet service, as described above), the user may click on a UI button to submit the request to provision the edge network protection service for that Internet service. This may result in the following actions: the selected IP address space may be associated with the edge protect tenant; the entitlements for configuring the service instances of the edge network protection service in the app are adjusted (e.g., reduced by one); the user is notified about the progress of the provisioning request and the completion of the provisioning process; and/or the user may be notified about the required steps to configure the DNS configuration on their CPE.

In some examples, the computing system may cause first CPE within the first circuit to be configured, by performing one of: sending a service ticket to an agent of the first service provider to manually configure or update DNS parameters of the first CPE based at least in part on the first service instance of the edge network protection service; automatically configuring or updating DNS parameters of the first CPE based at least in part on the first service instance of the edge network protection service; automatically configuring or updating DNS parameters of the first CPE based at least in part on the first service instance of the edge network protection service, by exposing the DNS parameters to the first CPE via a third API; or sending at least one first message to the customer with instructions for manually configuring or updating DNS parameters of the first CPE based at least in part on the first service instance of the edge network protection service; and/or the like.

According to some embodiments, the computing system may present, or may cause to be presented, options for a user who has configured an edge network protection service instance(s) to remove or delete such service instance(s), e.g., using a remove or delete service instance button(s) in the UI, or the like. When the user selects to remove the edge network protection service instance(s), the UI may present to the user, or may cause to be presented to the user, a dialog in the UI to confirm the removal of the edge network protection service instance. In the case that the first network service provider cannot perform removal of the service instance(s) on behalf of the user, the computing system may inform the user that they will need to reconfigure their DNS parameters to avoid any service disruptions. Once the user confirms the removal, the user may be notified about the required steps to re-configure the DNS configuration on their CPE (e.g., changing by pointing to a "regular DNS" instead of edge network protection service-based DNS, or the like).

In some examples, the computing system may receive a request to deprovision a second service instance of the edge network protection service from a fifth circuit, from among the one or more circuits. The computing system may cause second CPE within the fifth circuit to be configured, by performing one of: sending a service ticket to an agent of the first service provider to manually configure or update DNS parameters of the second CPE based at least in part on the deprovisioning of the second service instance of the edge network protection service; automatically configuring or updating DNS parameters of the second CPE based at least in part on the deprovisioning of the second service instance of the edge network protection service; automatically configuring or updating, by the computing system, DNS parameters of the second CPE based at least in part on the deprovisioning of the second service instance of the edge network protection service, by exposing the DNS parameters to the second CPE via a fourth API; or sending, by the computing system, at least one second message to the customer with instructions for manually configuring or updating DNS parameters of the second CPE based at least in part on the deprovisioning of the second service instance of the edge network protection service; and/or the like. The computing system may send at least one third message to the customer notifying the customer regarding a progress of the deprovisioning of the second service instance.

Figure 4A:
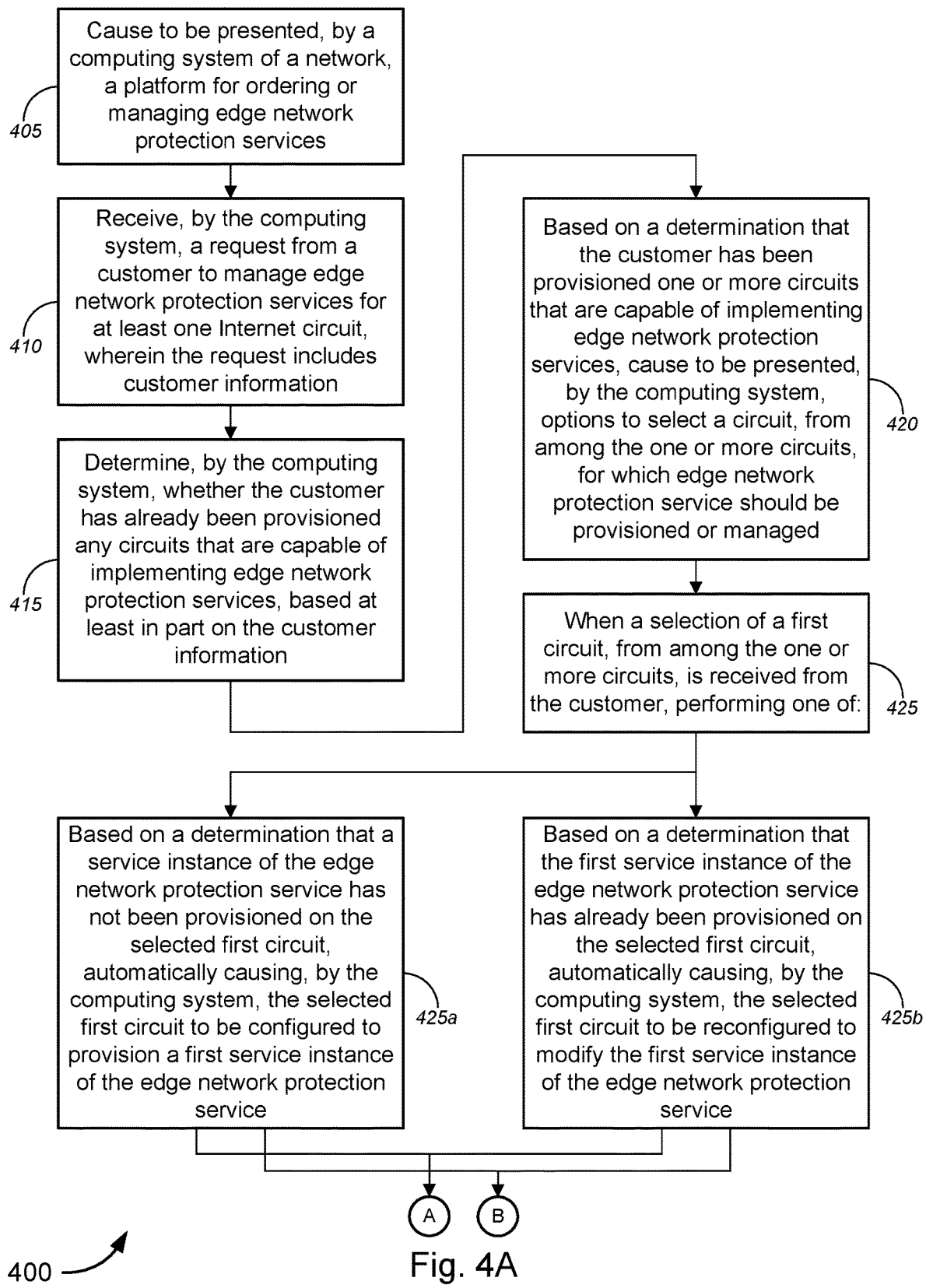
FIGS. 4A-4C are flow diagrams illustrating a method for implementing management of edge network protection service, in accordance with various embodiments.
Figure 4B:
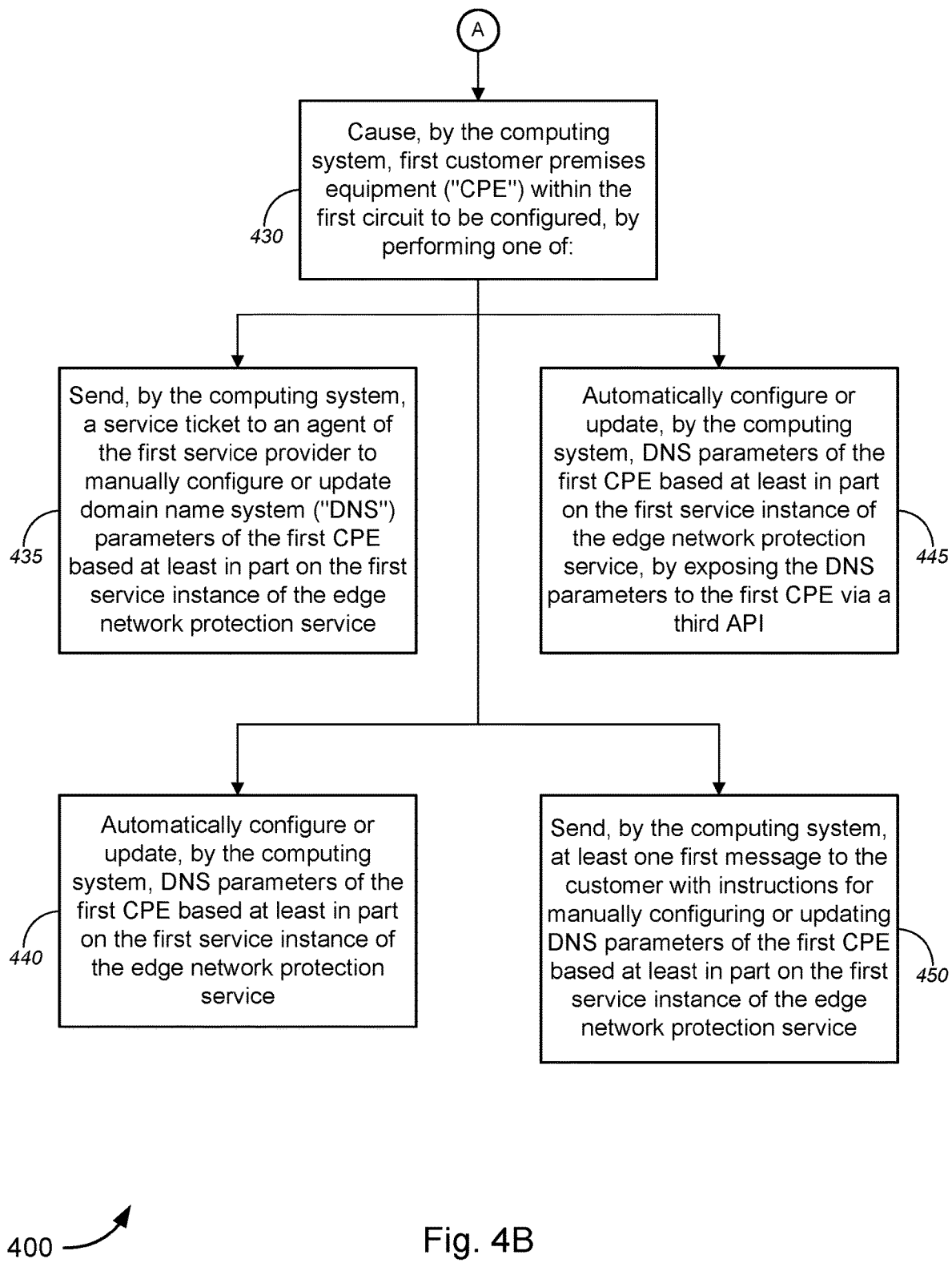
Figure 4C:
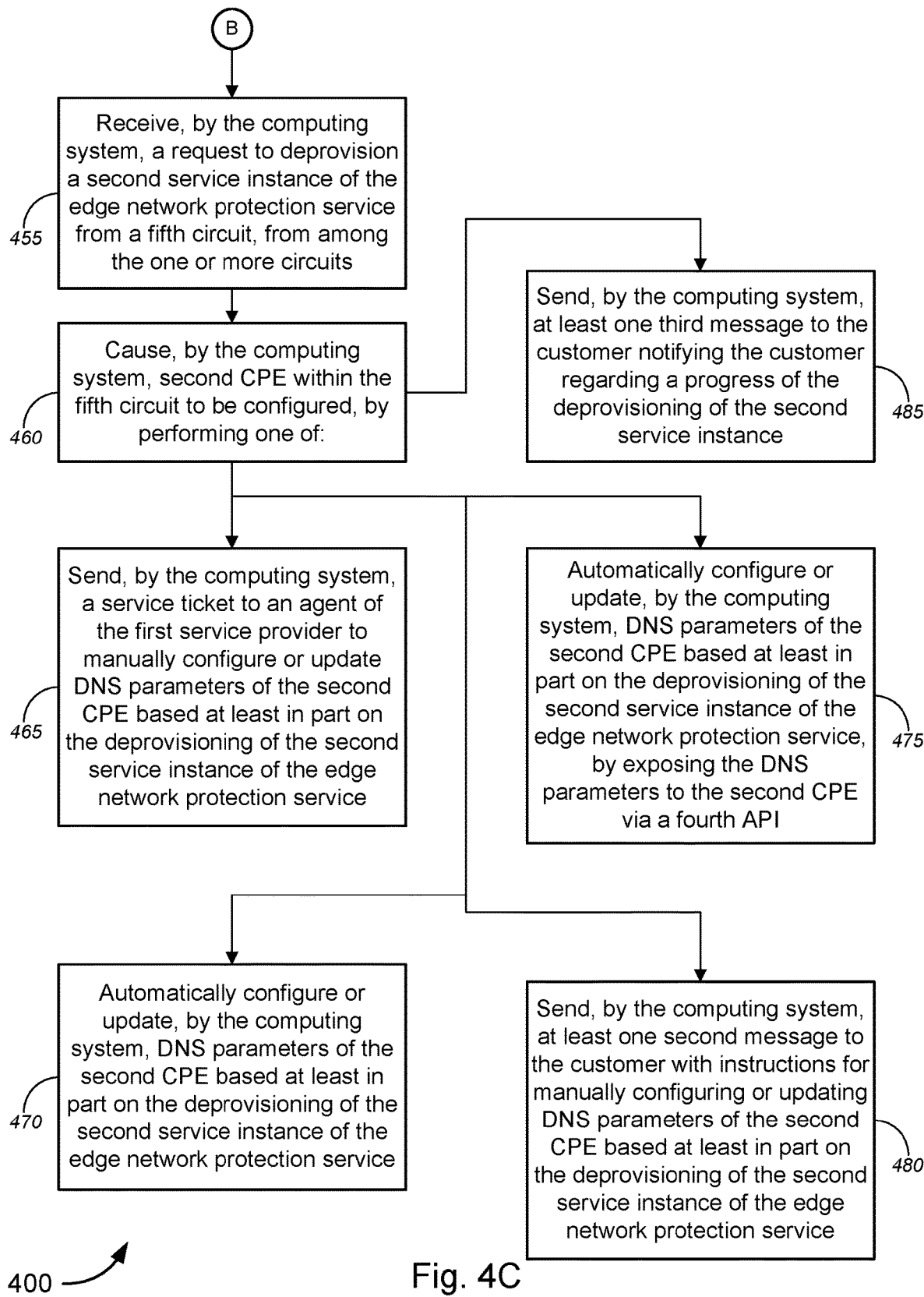

FIGS. 4A-4C (collectively, "FIG. 4") are flow diagrams illustrating a method 400 for implementing management of edge network protection service, in accordance with various embodiments. Method 400 of FIG. 4A continues onto FIG. 4B following the circular marker denoted, "A." In some examples, 400 of FIG. 4A continues onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, may comprise causing to be presented, by a computing system of a network, a platform for ordering or managing edge network protection services. In some embodiments, the computing system may include, without limitation, a provider configuration system, a control center ordering system, a server, a domain name system ("DNS") computing system, a DNS firewall system, a cloud computing system, or a distributed computing system, and/or the like.

At block 410, method 400 may comprise receiving, by the computing system, a request from a customer to manage edge network protection services for at least one Internet circuit, wherein the request includes customer information. Method 400 may further comprise, at block 415, determining, by the computing system, whether the customer has already been provisioned any circuits that are capable of implementing edge network protection services, based at least in part on the customer information. Method 400 may further comprise, based on a determination that the customer has been provisioned one or more circuits that are capable of implementing edge network protection services, causing to be presented, by the computing system, options to select a circuit, from among the one or more circuits, for which edge network protection service should be provisioned or managed (block 420).

According to some embodiments, causing to be presented the options to select a circuit, from among the one or more circuits, for which edge network protection service should be provisioned or managed may comprise causing to be presented the options in one of a user interface ("UI"), a software application ("app"), or a control portal for the customer to select a circuit, from among the one or more circuits, for which edge network protection service should be provisioned or managed. In examples, the computing system may perform at least one of: providing programmatic access to an ordering system via a first application programming interface ("API") by exposing the first API to permit programmatic ordering of new edge network protection services; providing programmatic access to a provider configuration system via a second API by exposing the second API to permit programmatic management of edge network protection services; causing a first UI to be presented, where the first UI provides user selectable options for the customer to order new edge network protection services; or causing a second UI to be presented, where the second UI provides user selectable options for the customer to manage edge network protection services; and/or the like. Alternatively, or additionally, the computing system may further perform at least one: causing to be presented options for additional security controls for utilizing domain name system ("DNS") functionalities; causing to be presented options for additional threat intelligence functionalities for a DNS firewall system; or causing to be presented options for specific configurations for the DNS firewall system; and/or the like.

At block 425, method 400 may comprise, when a selection of a first circuit, from among the one or more circuits, is received from the customer, performing one of: based on a determination that a service instance of the edge network protection service has not been provisioned on the selected first circuit, automatically causing, by the computing system, the selected first circuit to be configured to provision a first service instance of the edge network protection service (block 425a); or based on a determination that the first service instance of the edge network protection service has already been provisioned on the selected first circuit, automatically causing, by the computing system, the selected first circuit to be reconfigured to modify the first service instance of the edge network protection service (block 425b).

In some examples, method 400 may continue from the process at block 425a or 425b onto the process at block 430 in FIG. 4B, following the circular marker denoted, "A." In other examples, method 400 may continue from the process at block 425a or 425b onto the process at block 455 in FIG. 4D, following the circular marker denoted, "B."

At block 430 in FIG. 4B (following the circular marker denoted, "A," in FIG. 4A), method 400 may comprise causing, by the computing system, first customer premises equipment ("CPE") within the first circuit to be configured, by performing one of: sending, by the computing system, a service ticket to an agent of the first service provider to manually configure or update DNS parameters of the first CPE based at least in part on the first service instance of the edge network protection service (block 435); automatically configuring or updating, by the computing system, DNS parameters of the first CPE based at least in part on the first service instance of the edge network protection service (block 440); automatically configuring or updating, by the computing system, DNS parameters of the first CPE based at least in part on the first service instance of the edge network protection service, by exposing the DNS parameters to the first CPE via a third API (block 445); or sending, by the computing system, at least one first message to the customer with instructions for manually configuring or updating DNS parameters of the first CPE based at least in part on the first service instance of the edge network protection service (block 450); and/or the like.

In some examples, at block 455 in FIG. 4C (following the circular marker denoted, "B," in FIG. 4A), method 400 may comprise receiving, by the computing system, a request to deprovision a second service instance of the edge network protection service from a fifth circuit, from among the one or more circuits. Method 400, at block 460, may comprise causing, by the computing system, second CPE within the fifth circuit to be configured, by performing one of: sending, by the computing system, a service ticket to an agent of the first service provider to manually configure or update DNS parameters of the second CPE based at least in part on the deprovisioning of the second service instance of the edge network protection service (block 465); automatically configuring or updating, by the computing system, DNS parameters of the second CPE based at least in part on the deprovisioning of the second service instance of the edge network protection service (block 470); automatically configuring or updating, by the computing system, DNS parameters of the second CPE based at least in part on the deprovisioning of the second service instance of the edge network protection service, by exposing the DNS parameters to the second CPE via a fourth API (block 475); or sending, by the computing system, at least one second message to the customer with instructions for manually configuring or updating DNS parameters of the second CPE based at least in part on the deprovisioning of the second service instance of the edge network protection service (block 480); and/or the like. At block 485, method 400 may comprise sending, by the computing system, at least one third message to the customer notifying the customer regarding a progress of the deprovisioning of the second service instance.

In some embodiments, the selected first circuit may be caused to be configured to provision the service instance of the edge network protection service. In such cases, the computing system may cause a first edge protect tenant to be created in a control portal; and may associate the created first edge protect tenant with at least one of the first service instance of the edge network protection service or an Internet Protocol ("IP") address space that is assigned to the selected first circuit. In some instances, the control portal may be accessible by the customer via single sign-on ("SSO") functionality. In some examples, the computing system may apply distributed denial of service ("DDoS") protection to destination IP addresses that are specified on the selected first circuit, based on the provisioned first service instance of the edge network protection service. In some examples, the computing system may add the first service instance of the edge network protection service to the first edge protect tenant.

According to some embodiments, based on a selection by the customer to configure at least one new second circuit from among the one or more circuits, the computing system may determine a first number of circuits that the customer has already configured out of a total number of circuits that the customer has ordered, and may update a number of entitlements that the customer is assigned based on the determined first number of circuits. In some cases, based on a determination that a third circuit, from among the one or more circuits, has been selected and has been already configured or ordered, the computing system may cause an ordering system to communicate with a provider configuration system to perform at least one of incrementing the first number of circuits or decrementing the updated number of entitlements. In some examples, when instructions for selecting a fourth circuit, from among the one or more circuits, to delete a service instance of edge network protection service have been received from the customer, the computing system may cause the provider configuration system to perform at least one of decrementing the first number of circuits or incrementing the updated number of entitlements.

In some embodiments, the network may comprise a first network associated with a first network service provider. In such cases, the computing system may cause to be presented options to select at least one third party circuit for which edge network protection service should be provisioned or managed, the at least one third party circuit being operated and provisioned by a second network service provider that is different from the first network service provider. The computing system may also cause to be presented options for entering circuit information for the at least one third party circuit.

Example System and Hardware Implementation

Figure 5:
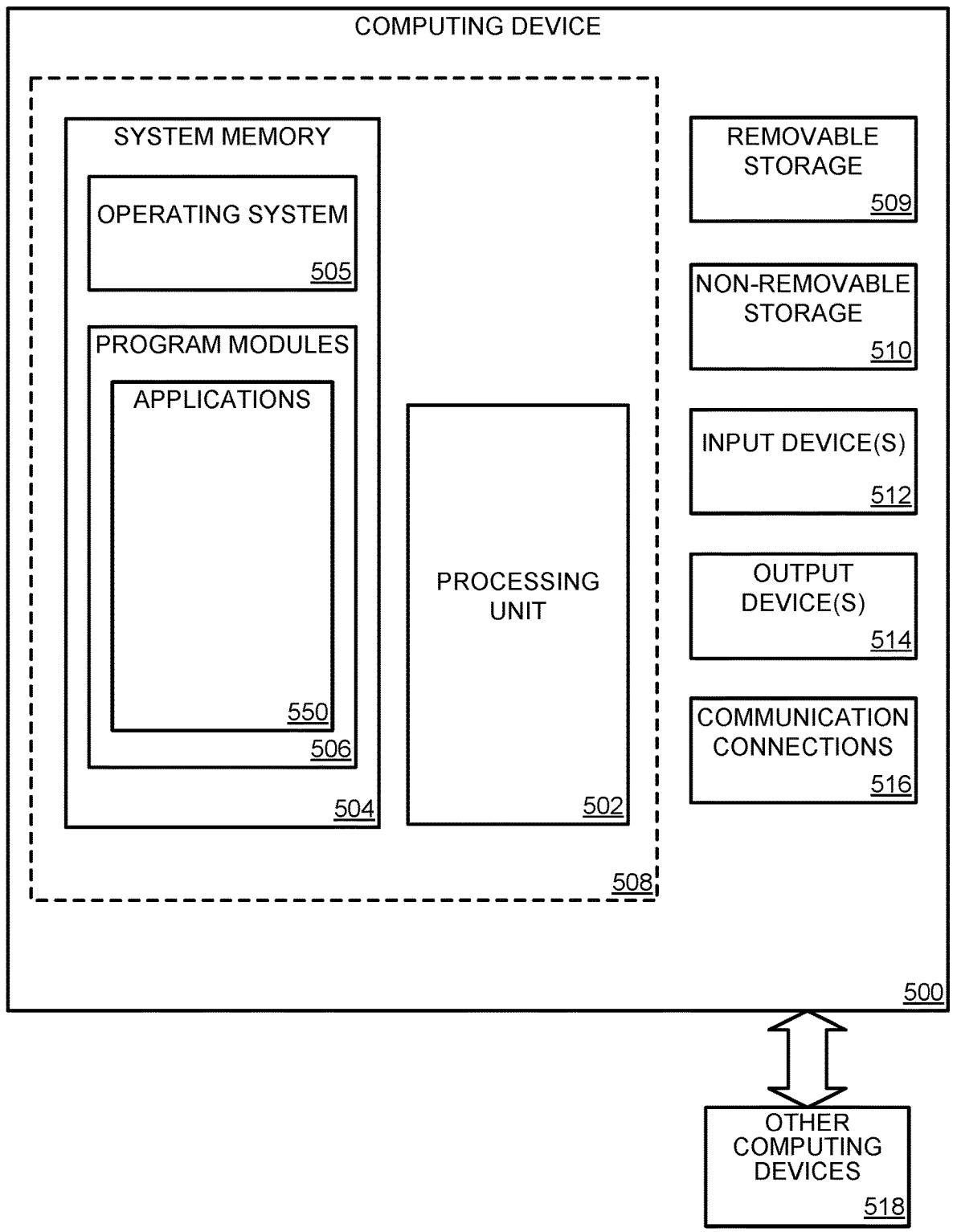
FIG. 5 is a block diagram illustrating an example computing environment in which systems and methods of the present application can be implemented, in accordance with various embodiments.

FIG. 5 is a block diagram illustrating physical components (i.e., hardware) of a computing device 500 with which examples of the present disclosure may be practiced. The computing device components described below may be suitable for a client device implanting one or more of the provider configuration system 102, the DNS firewall system 108, or other components of FIGS. 1-3. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 to implement one or more of the systems described above with respect to FIGS. 1-3.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape, etc. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including, but not limited to, one or more of the operations of the methods illustrated in FIGS. 4A-4C, or as described with respect to FIGS. 1-3, or the like. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples, and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports; and/or the like.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage, etc.). Computer storage media may include RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving, by a computing system of a network, a request from a customer to manage edge network protection services for at least one Internet circuit, wherein the request includes customer information;
   determining, by the computing system, whether the customer has already been provisioned any circuits that are capable of implementing edge network protection services, based at least in part on the customer information;
   based on a determination that the customer has been provisioned one or more circuits that are capable of implementing edge network protection services, causing to be presented, by the computing system, options to select a circuit, from among the one or more circuits, for which edge network protection service should be provisioned or managed;
   when a selection of a first circuit, from among the one or more circuits, is received from the customer, performing one of:
   based on a determination that a service instance of the edge network protection service has not been provisioned on the selected first circuit, automatically causing, by the computing system, the selected first circuit to be configured to provision a first service instance of the edge network protection service; or
   based on a determination that the first service instance of the edge network protection service has already been provisioned on the selected first circuit, automatically causing, by the computing system, the selected first circuit to be reconfigured to modify the first service instance of the edge network protection service; and
   based on a selection by the customer to configure at least one new second circuit from among the one or more circuits, determining, by the computing system, a first number of circuits that the customer has already configured out of a total number of circuits that the customer has ordered, and updating, by the computing system, a number of entitlements that the customer is assigned based on the determined first number of circuits.

2. The method of claim 1, wherein the computing system comprises a provider configuration system, a control center ordering system, a server, a domain name system ("DNS") computing system, a DNS firewall system, a cloud computing system, or a distributed computing system.

3. The method of claim 1, wherein causing to be presented the options to select a circuit, from among the one or more circuits, for which edge network protection service should be provisioned or managed comprises causing to be presented the options in one of a user interface ("UI"), a software application ("app"), or a control portal for the customer to select a circuit, from among the one or more circuits, for which edge network protection service should be provisioned or managed.

4. The method of claim 3, further comprising at least one of:
providing, by the computing system, programmatic access to an ordering system via a first application programming interface ("API") by exposing the first API to permit programmatic ordering of new edge network protection services;
providing, by the computing system, programmatic access to a provider configuration system via a second API by exposing the second API to permit programmatic management of edge network protection services;
causing, by the computing system, a first UI to be presented, wherein the first UI provides user selectable options for the customer to order new edge network protection services; or
causing, by the computing system, a second UI to be presented, wherein the second UI provides user selectable options for the customer to manage edge network protection services.

5. The method of claim 1, further comprising at least one of:
presenting, by the computing system, options for additional security controls for utilizing domain name system ("DNS") functionalities;
presenting, by the computing system, options for additional threat intelligence functionalities for a DNS firewall system; or
presenting, by the computing system, options for specific configurations for the DNS firewall system.

6. The method of claim 1, further comprising at least one of:
in response to adding a first domain to an access-allowed list and to override any category determinations, adding, by the computing system, the first domain to the access-allowed list while overriding any category determinations for the first domain;
causing, by the computing system, at least one of a tenant data system or a category information system to alert a threat intelligence system when a number or percentage of customers have added a second domain that appears in a known malicious domains list to an access-allowed list;
in response to being alerted, causing, by the computing system, the threat intelligence system to review the second domain to determine whether it should remain on the known malicious domains list; or
causing, by the computing system, at least one of the tenant data system or the category information system to alert the threat intelligence system when a number of percentage of tenants have added a third domain to an access-denied list; or
logging, by the computing system, information indicating a frequency at which DNS requests are being rejected, the information including domains or categories for which DNS requests are being rejected.

7. The method of claim 1, wherein the selected first circuit is caused to be configured to provision the service instance of the edge network protection service, wherein the method may further comprise:
causing, by the computing system, a first edge protect tenant to be created in a control portal; and
associating, by the computing system, the created first edge protect tenant with at least one of the first service instance of the edge network protection service or an Internet Protocol ("IP") address space that is assigned to the selected first circuit.

8. The method of claim 7, wherein the control portal is accessible by the customer via single sign-on ("SSO") functionality.

9. The method of claim 7, further comprising:
applying distributed denial of service ("DDoS") protection to destination IP addresses that are specified on the selected first circuit, based on the provisioned first service instance of the edge network protection service.

10. The method of claim 7, further comprising:
adding the first service instance of the edge network protection service to the first edge protect tenant.

11. The method of claim 1, further comprising, after the edge network protection service for the customer has been disconnected and in response to receiving a DNS request from the customer:
based on a determination that the selected first circuit is no longer associated with the first edge protect tenant that is associated with the first service instance of the edge network protection service, performing at least one of:
rejecting, by the computing system, the DNS request;
forwarding, by the computing system, the DNS request to a different server;
forwarding, by the computing system, the DNS request to the different server only for a predetermined period after disconnection of the edge network protection service, and rejecting, by the computing system, DNS requests after the predetermined period;
notifying, by the computing system, the customer that DNS requests are being rejected and that a customer premises equipment ("CPE") within the selected first circuit needs to be configured to address DNS requests elsewhere; or
notifying, by the computing system, the customer of the predetermined period before DNS requests will start to be rejected without the CPE being configured to address DNS requests to a different server.

12. The method of claim 1, further comprising:
based on a determination that a third circuit, from among the one or more circuits, has been selected and has been already configured or ordered, causing, by the computing system, an ordering system to communicate with a provider configuration system to perform at least one of incrementing the first number of circuits or decrementing the updated number of entitlements.

13. The method of claim 1, further comprising:
when instructions for selecting a fourth circuit, from among the one or more circuits, to delete a service instance of edge network protection service have been received from the customer, causing, by the computing system, the provider configuration system to perform at least one of decrementing the first number of circuits or incrementing the updated number of entitlements.

14. The method of claim 1, wherein the network comprises a first network associated with a first network service provider, wherein the method further comprises:
    causing to be presented, by the computing system, options to select at least one third party circuit for which edge network protection service should be provisioned or managed, the at least one third party circuit being operated and provisioned by a second network service provider that is different from the first network service provider; and
    causing to be presented, by the computing system, options for entering circuit information for the at least one third party circuit.

15. The method of claim 14, further comprising:
    causing, by the computing system, first customer premises equipment ("CPE") within the first circuit to be configured, by performing one of:
    sending, by the computing system, a service ticket to an agent of the first service provider to manually configure or update domain name system ("DNS") parameters of the first CPE based at least in part on the first service instance of the edge network protection service;
    automatically configuring or updating, by the computing system, DNS parameters of the first CPE based at least in part on the first service instance of the edge network protection service;
    automatically configuring or updating, by the computing system, DNS parameters of the first CPE based at least in part on the first service instance of the edge network protection service, by exposing the DNS parameters to the first CPE via a third application programming interface ("API"); or
    sending, by the computing system, at least one first message to the customer with instructions for manually configuring or updating DNS parameters of the first CPE based at least in part on the first service instance of the edge network protection service.

16. The method of claim 14, further comprising:
    receiving, by the computing system, a request to deprovision a second service instance of the edge network protection service from a fifth circuit, from among the one or more circuits;
    causing, by the computing system, second CPE within the fifth circuit to be configured, by performing one of:
    sending, by the computing system, a service ticket to an agent of the first service provider to manually configure or update DNS parameters of the second CPE based at least in part on the deprovisioning of the second service instance of the edge network protection service;
    automatically configuring or updating, by the computing system, DNS parameters of the second CPE based at least in part on the deprovisioning of the second service instance of the edge network protection service;
    automatically configuring or updating, by the computing system, DNS parameters of the second CPE based at least in part on the deprovisioning of the second service instance of the edge network protection service, by exposing the DNS parameters to the second CPE via a fourth API; or
    sending, by the computing system, at least one second message to the customer with instructions for manually configuring or updating DNS parameters of the second CPE based at least in part on the deprovisioning of the second service instance of the edge network protection service. sending, by the computing system, at least one third message to the customer notifying the customer regarding a progress of the deprovisioning of the second service instance.

17. A system, comprising:
    a computing system, comprising:
    at least one first processor; and
    a first non-transitory computer readable medium communicatively coupled to the at least one first processor, the first non-transitory computer readable medium having stored thereon computer software comprising a first set of instructions that, when executed by the at least one first processor, causes the computing system to:
    receive, a request from a customer to manage edge network protection services for at least one Internet circuit, wherein the request includes customer information;
    determine whether the customer has already been provisioned any circuits that are capable of implementing edge network protection services, based at least in part on the customer information;
    based on a determination that the customer has been provisioned one or more circuits that are capable of implementing edge network protection services, cause to be presented options to select a circuit, from among the one or more circuits, for which edge network protection service should be provisioned or managed;
    when a selection of a first circuit, from among the one or more circuits, is received from the customer, perform one of:
    based on a determination that a service instance of the edge network protection service has not been provisioned on the selected first circuit, automatically causing the selected first circuit to be configured to provision a first service instance of the edge network protection service; or
    based on a determination that the first service instance of the edge network protection service has already been provisioned on the selected first circuit, automatically causing the selected first circuit to be reconfigured to modify the first service instance of the edge network protection service; and
    based on a selection by the customer to configure at least one new second circuit from among the one or more circuits, determining, by the computing system, a first number of circuits that the customer has already configured out of a total number of circuits that the customer has ordered, and updating, by the computing system, a number of entitlements that the customer is assigned based on the determined first number of circuits.

18. The system of claim 17, wherein causing to be presented the options to select a circuit, from among the one or more circuits, for which edge network protection service should be provisioned or managed comprises causing to be presented the options in one of a user interface ("UI"), a software application ("app"), or a control portal for the customer to select a circuit, from among the one or more circuits, for which edge network protection service should be provisioned or managed, and wherein the first set of instructions, when executed by the at least one first processor, further causes the computing system to perform at least one of:
    providing programmatic access to an ordering system via a first application programming interface ("API") by exposing the first API to permit programmatic ordering of new edge network protection services;

providing programmatic access to a provider configuration system via a second API by exposing the second API to permit programmatic management of edge network protection services;

causing a first UI to be presented, wherein the first UI provides user selectable options for the customer to order new edge network protection services; or causing a second UI to be presented, wherein the second UI provides user selectable options for the customer to manage edge network protection services.

19. A method, comprising:

receiving, by a computing system of a network, a request from a customer to manage edge network protection services for at least one Internet circuit, wherein the request includes customer information;

determining, by the computing system, whether the customer has already been provisioned any circuits that are capable of implementing edge network protection services, based at least in part on the customer information;

based on a determination that the customer has been provisioned one or more circuits that are capable of implementing edge network protection services, causing to be presented, by the computing system, options to select a circuit, from among the one or more circuits, for which edge network protection service should be provisioned or managed;

when a selection of a first circuit, from among the one or more circuits, is received from the customer, automatically causing, by the computing system, the selected first circuit to be configured to provision a first service instance of the edge network protection service; and based on a selection by the customer to configure at least one new second circuit from among the one or more circuits, determining, by the computing system, a first number of circuits that the customer has already configured out of a total number of circuits that the customer has ordered, and updating, by the computing system, a number of entitlements that the customer is assigned based on the determined first number of circuits.

\* \* \* \* \*